United States Patent
Jiang et al.

(10) Patent No.: US 9,784,349 B2
(45) Date of Patent: Oct. 10, 2017

(54) LINEAR ACTUATOR

(71) Applicant: LINAK A/S, Nordborg (DK)

(72) Inventors: Liyong Jiang, Shenzhen (CN);
Zhongzheng Liu, Shenzhen (CN)

(73) Assignee: Linak A/S, Nordborg (DK)

( * ) Notice: Subject to any disclaimer, the term of this patent is extended or adjusted under 35 U.S.C. 154(b) by 0 days.

(21) Appl. No.: 14/801,299

(22) Filed: Jul. 16, 2015

(65) Prior Publication Data
US 2016/0040765 A1    Feb. 11, 2016

(30) Foreign Application Priority Data
Jul. 16, 2014   (DK) .............................. 2014 00388

(51) Int. Cl.
F16H 25/20   (2006.01)

(52) U.S. Cl.
CPC ..... *F16H 25/20* (2013.01); *F16H 2025/2037* (2013.01); *F16H 2025/2084* (2013.01)

(58) Field of Classification Search
CPC .. F16H 25/20; F16H 25/24; F16H 2025/2037; A47C 20/04
USPC .... 403/191, 276, 277, 73, 67, 399; 254/126; 74/89.23, 127, 424.71; 5/617, 618
See application file for complete search history.

(56) References Cited

U.S. PATENT DOCUMENTS

| 2,200,565 | A | * | 5/1940 | Sticklin ................. B63H 16/06 403/375 |
| 2,465,601 | A |   | 3/1949 | Ochtman |
| 2,531,109 | A |   | 11/1950 | Chapman |
| 3,897,833 | A | * | 8/1975 | Frisbee .................... E02F 3/80 172/830 |
| 5,927,144 | A |   | 7/1999 | Koch |
| 6,202,803 | B1 |   | 3/2001 | Lang |
| 6,377,010 | B1 |   | 4/2002 | Roither |
| 7,066,041 | B2 |   | 6/2006 | Nietsen |
| 7,819,036 | B2 |   | 10/2010 | Haneball et al. |
| 7,900,302 | B2 | * | 3/2011 | Long .................... A47C 20/041 5/617 |
| 8,015,890 | B2 |   | 9/2011 | Christensen et al. |

(Continued)

FOREIGN PATENT DOCUMENTS

DE    20302137    5/2003

OTHER PUBLICATIONS

English Abstract of DE 20302137.

*Primary Examiner* — Victor MacArthur
*Assistant Examiner* — Bobby Rushing, Jr.
(74) *Attorney, Agent, or Firm* — Dykema Gossett PLLC

(57) ABSTRACT

A linear actuator includes a back fixture formed of a first part, a second part, and a plastic bearing, the first part connecting with the second part, grooves are disposed inside the first part and the second part, and extra structures are disposed outside the plastic bearing. The plastic bearing is secured inside the first part and the second part with the grooves and extra structures. The back fixture can be directly fitted onto a bed frame by applying a certain force to make an elastic deformation of this back fixture, thereby accelerating the installation of the actuator. This not only significantly reduces the noise caused by the connecting portion during the operation of the actuator, but also reduces the wearing of connecting parts, thereby significantly extending maintenance-free life.

10 Claims, 7 Drawing Sheets

(56) References Cited

U.S. PATENT DOCUMENTS 8,668,402 B2 * 3/2014 Mori .................. F16B 2/10
　　　　　　　　　　　　　　　　　　　403/170

* cited by examiner

LINEAR ACTUATOR

TECHNICAL FIELD OF THE INVENTION

The present invention relates to a linear actuator, and in particular to a back fixture disposed at the end of a linear actuator. The type of linear actuator in question is, e.g., disclosed in WO 02/29284 A1 to Linak A/S and WO 96/12123 A1 to Dietmar Koch (Okin), the contents thereof being incorporated herein by reference.

BACKGROUND OF THE INVENTION

Currently most of the linear actuators in the market are connected to beds, either by plugging the bolts in the corresponding through-holes and fastening them by nuts, or by plugging the cotter pins in the corresponding hole on the connecting pin after it is assembled. Either way involves a large number of parts, a high cost, and a relatively complicated assembly procedure that requires much human effort. The sliding friction occurring between metals also causes a certain level of noise pollution to the operating environment and therefore limits the application of the actuator. In addition, the wearing of parts caused by friction results in additional maintenance costs.

As an example of fixtures, reference can be made to WO 2005/079134 A2 to Linak A/S, wherein both the back fixture as well as the front fixture is an eye. This is also the case in U.S. Pat. No. 2,531,109 to Capmann, which discloses a linear actuator for landing wheels for airplanes. In U.S. Pat. No. 2,465,601 to Ochtman the front fixing is likewise an eye, although designed as a separate element, which may be screwed into the end of the tubular activation element, such that it is possible to adjust the eye to the structure in which the actuator is incorporated. DE 20 2004 002 254 U1 to Dewert Antriebs- und Systemtechnik GmbH & Co. KG discloses a linear actuator wherein the back fixture is a fork fixture, while the front fixture is an eye, which simply is designed as a hole in the free end of the tubular activation element. DE 299 19 214 U1 to Dewert Antriebs- und Systemtechnik GmbH & Co. KG discloses a linear actuator wherein both the back fixture as well as the front fixture is a fork fixture. A special embodiment of a linear actuator based on an U-profile is shown in DE 203 02 137 U1 to Dewert Antriebs- und Systemtechnik GmbH & Co. KG, but also in this case both the back fixture as well as the front fixture is designed as an eye. U.S. Pat. No. 6,202,803 B1 to Lang discloses a linear actuator for adjusting slats (the front edges) and flaps on an airplane. The back fixture and the front fixture are here designed with a spherical bearing, which is a troublesome and expensive construction.

SUMMARY OF THE INVENTION

The object of the present invention is to provide a linear actuator wherein its back fixture can be easily and quickly installed and can significantly reduce the noise caused by the connecting portion and the wearing caused by the friction of the connecting parts.

To achieve this the present invention provides a linear actuator, including a first part, a second part, and a plastic bearing, wherein the first part connects with the second part, grooves are disposed inside the first part and the second part, and extra structures are disposed outside the plastic bearing, and the plastic bearing is secured inside the first part and the second part with the grooves and extra structures.

The first part and the second part are part of the back fixture by fitting with each other. The first part and the second part, after assembly, form an open C-shape; the plastic bearing is then secured inside the back fixture with the corresponding grooves and extra structures to form an elastic deformable back fixture. The back fixture is disposed at the end of the actuator so that it can be directly fitted into the tubing of the bed frame by applying a certain force to make an elastic deformation of this back fixture. This accelerates the one-stop installation of the actuator. In addition, the self-lubricating property and the small friction coefficient of the plastic bearing of the back fixture significantly reduces the noise caused by the connecting portion during the operation of the actuator and the wearing of connecting parts, thereby significantly extending the maintenance-free time.

A further improvement of the present invention is that pins and holes are disposed on the first part and the second part to secure the assembly of them.

A further improvement of the present invention is that four sets of pins and holes are disposed to secure the assembly of the first part and the second part.

A further improvement of the present invention is that four extra structures are disposed outside the plastic bearing, and totally four grooves are disposed inside the first part and the second part.

A further improvement of the present invention is that a spring lock is disposed to connect the first and second parts. Preferably, through-holes are disposed on the first part and the second part to secure the spring lock.

A further improvement of the present invention is that a gasket is connected to the spring lock. Preferably, the gasket includes three stoppers that connect the spring lock with the gasket.

A further improvement of the present invention is that a bracket is disposed outside the first part and the second part, the bracket being a hollow cylinder that covers the first part and the second part.

Compared with the prior art, the benefits of the present invention are as follows: The first part and the second part, after assembly, form an open C-shape; the plastic bearing is then secured inside the back fixture with the corresponding grooves and extra structures to form an elastic deformable back fixture, and the back fixture is secured at the end of the actuator so that it can be directly fitted onto the tubing of the bed frame by applying a certain force to make an elastic deformation of this back fixture. This accelerates the one-stop installation of the actuator and significantly reduces the noise caused by connecting portion during the operation of the actuator and the wearing of connecting parts, thereby significantly extending maintenance-free time.

DETAILED DESCRIPTION OF THE DRAWINGS

Figure 1:
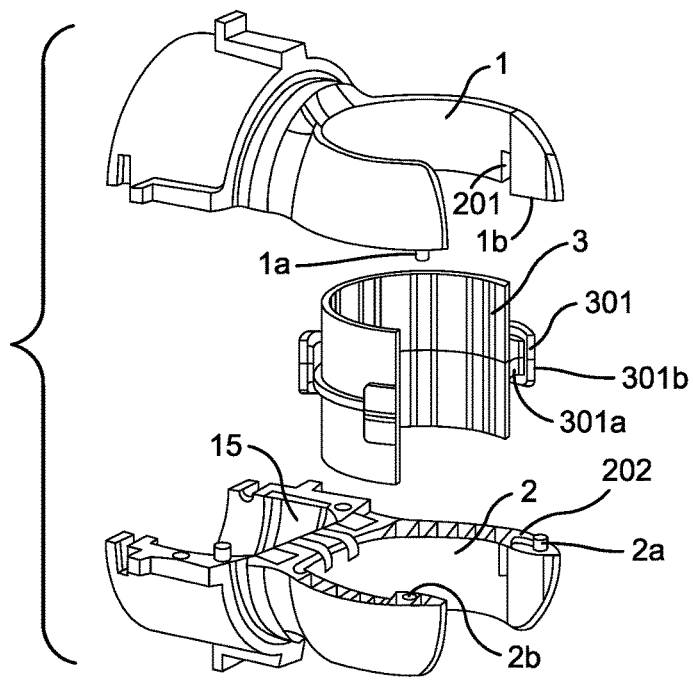
FIG. 1 is an exploded view of a fixture for a linear actuator according to a first embodiment of the present invention.

As shown in FIGS. 1 to 6, a first embodiment of a back fixture for an actuator according to the present invention includes a first part 1, a second part 2, and a plastic bearing 3. The first part 1 and second part 2 connect by studs 1a, 2a and mating holes 1b, 2b which are disposed in abutting edges of the first part 1 and the second part 2. The plastic bearing 3 includes extra structures 301 in the shape of studs 301a having a head 301b on the distal end of a stem at its lateral side. The plastic bearing 3 is secured inside the first part 1 and second part 2 with the extra structures 301 fitting into corresponding grooves 201, 202, the grooves having a T-shaped cross-section corresponding to the cross-section of the structures 301.

Figure 2:
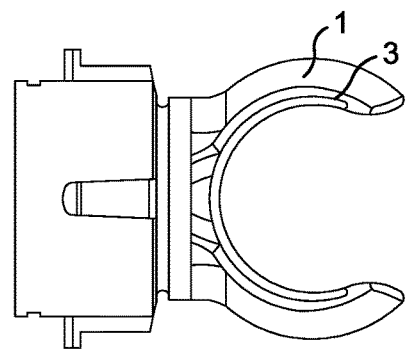
FIG. 2 is a side view of the fixture of FIG. 1 when assembled.
Figure 3:
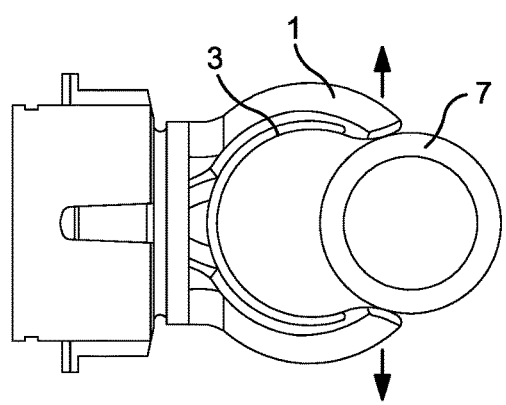
FIG. 3 is a view of the fixture as seen in FIG. 2 being connected to a shaft of a bed.
Figure 4:
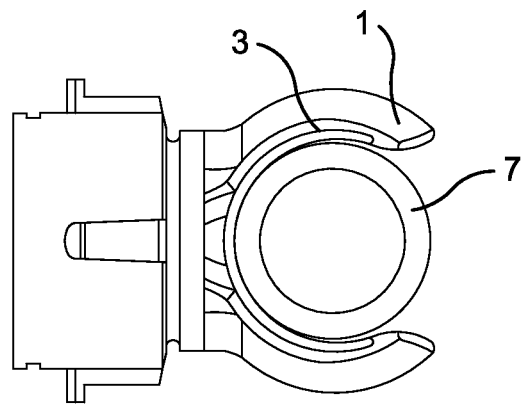
FIG. 4 is a view of the fixture as seen in FIG. 3 after connecting to the bed shaft.

The first part 1 and the second part 2 are part of the back fixture by fitting with each other. The first part 1 and the second part 2, after assembly, form an open C-shape. The plastic bearing 3 is then secured inside the back fixture with the corresponding grooves and the extra structures 301 to form a deformable back fixture. FIG. 1 shows exploded structural diagram of the back fixture, and FIG. 2 shows an overall structural diagram of the back fixture. The back fixture is disposed at the end of the actuator so that it can be directly fitted onto the cylindrical shaft 7 of the bed frame by applying a certain force to make an elastic deformation of this back fixture, thereby accelerating the one-stop installation of the actuator. FIG. 3 shows an assembly process diagram, and FIG. 4 shows a structural diagram after assembly. In addition, the self-lubricating property and the small friction coefficient of the plastic bearing 3 (see FIG. 5 for the sectional structural diagram of the plastic bearing 3 and FIG. 6 for the overall structural diagram) significantly reduces the noise caused by the connecting portion during the operation of the actuator and the wearing of the connecting parts, thereby significantly extending their maintenance-free life.

In a second embodiment of the invention, cooperating pins and holes are disposed on the first part 1 and the second part 2 to secure their assembly. Preferably, four sets of pins and holes are employed.

Figure 5:
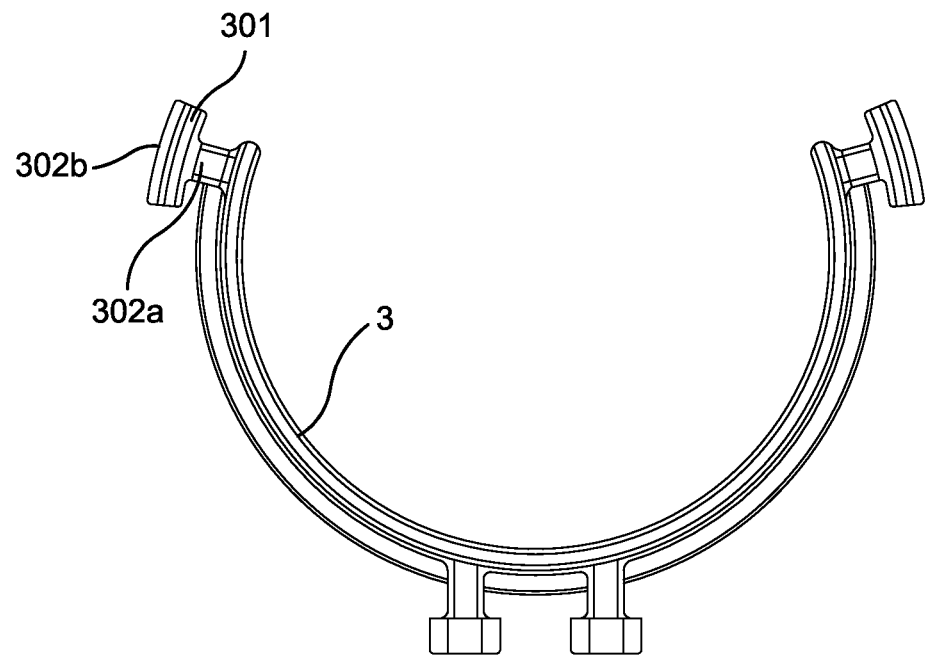
FIG. 5 is an enlarged sectional view of a plastic bearing in the fixture of FIG. 1.
Figure 6:
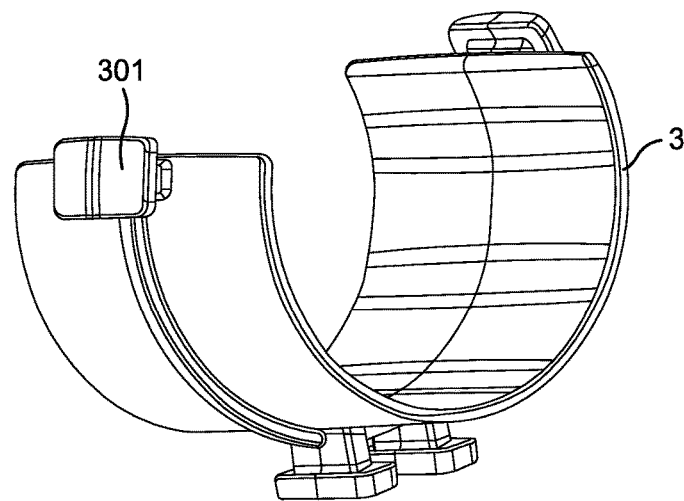
FIG. 6 is a perspective view of the plastic bearing of FIG. 5.

As shown in FIGS. 5 and 6, four extra structures 301 are disposed outside the plastic bearing 3, and four corresponding grooves are disposed inside the first part 1 and the second part 2.

Figure 7:
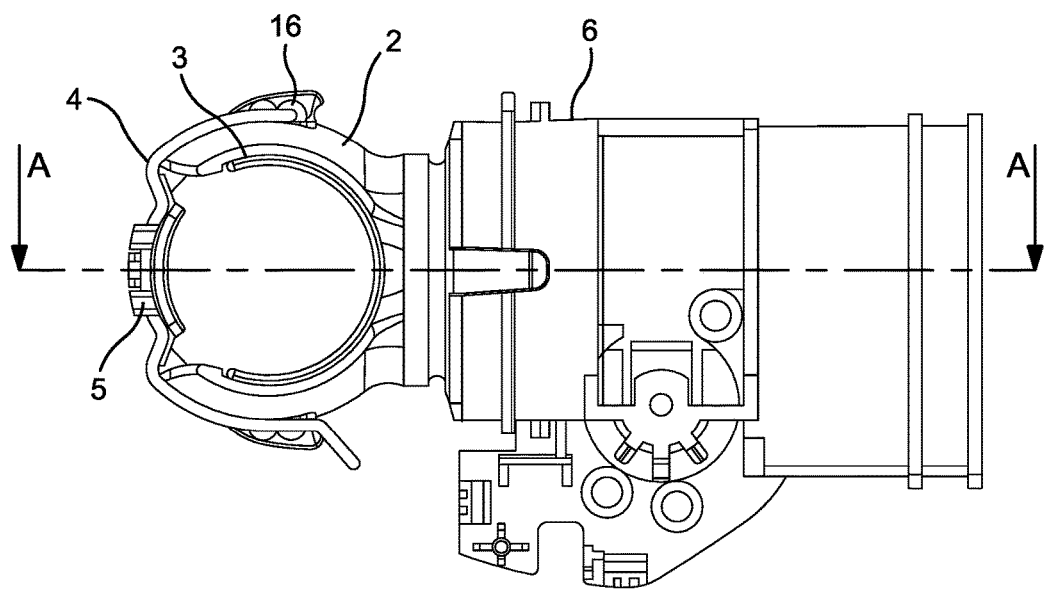
FIG. 7 is a side view of a fixture according to a second embodiment of the present invention when connected to a bracket.
Figure 8:
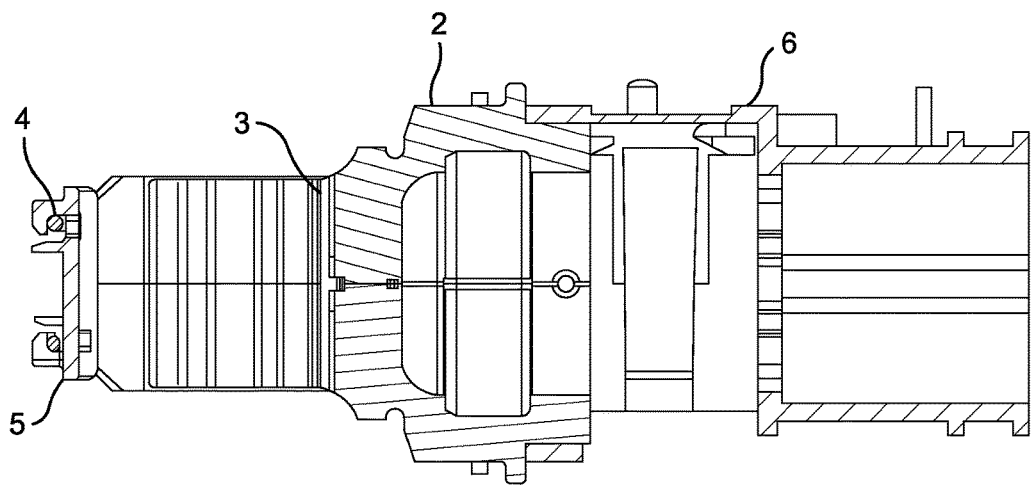
FIG. 8 is a cross section of the fixture and bracket as seen along line 8-8 of FIG. 7.
Figure 9:
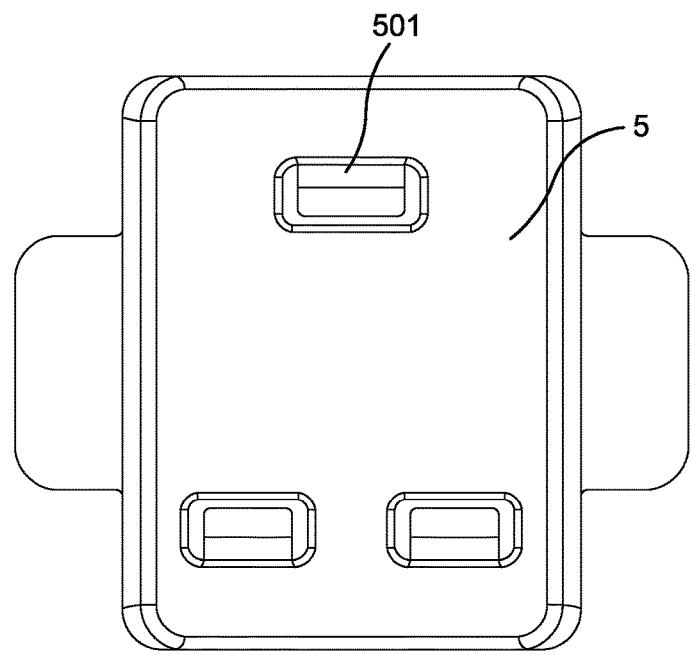
FIG. 9 is an enlarged sectional view of the gasket in the fixture of FIG. 7.
Figure 10:
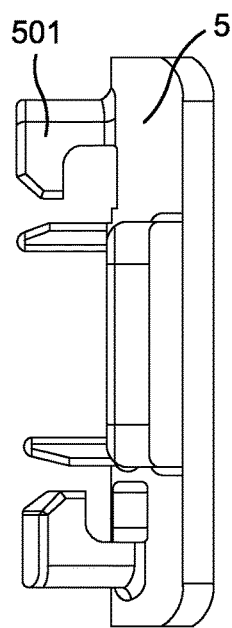
FIG. 10 is another sectional view of the gasket of FIG. 7.
Figure 11:
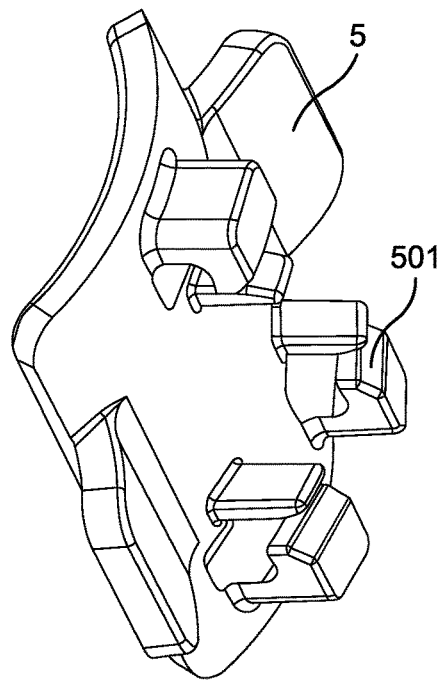
FIG. 11 is a perspective view of the gasket of FIG. 10.
Figure 12:
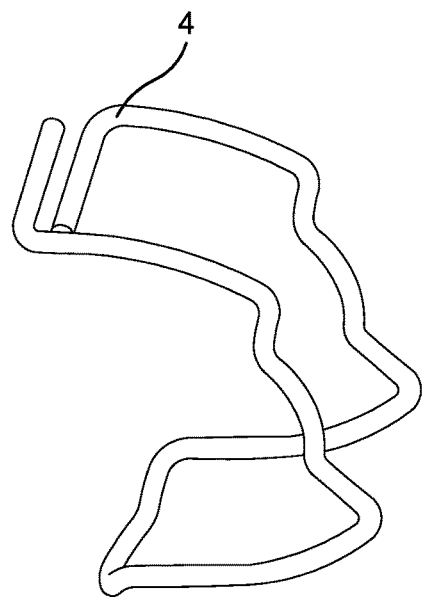
FIG. 12 is a perspective view of the spring lock of the fixture of FIG. 7.
Figure 13:
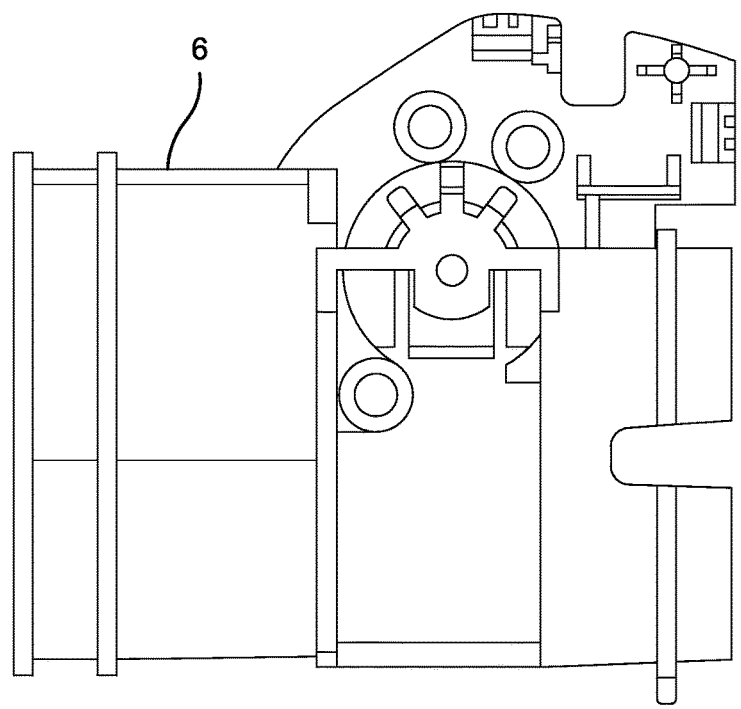
FIG. 13 is a side view of the bracket of FIG. 7.

As shown in FIGS. 7 to 13, in this embodiment a spring lock 4, a gasket 5, and a cylindrical bracket 6 are included, where the spring lock 4 connects to the first part 1 and the second part 2 part, the gasket 5 connects to the spring lock 4, and the cylindrical bracket 6 is disposed outside the first part 1 and the second part 2. FIG. 7 is an overall structural diagram; FIG. 8 is a sectional structural diagram of 8-8 of FIG. 7; FIG. 9 is a transverse-sectional structural diagram of the gasket 5; FIG. 10 is a lengthwise-sectional structural diagram of the gasket 5; FIG. 11 is an overall structural diagram of the gasket 5; FIG. 12 is an overall structural diagram of the spring lock 4; and FIG. 13 is an overall structural diagram of the cylindrical bracket 6.

In this embodiment, the assembly process is as follows: The plastic bearing 3 and the first part 1 are assembled by using four extra structures 301 outside the plastic bearing 3 and the corresponding grooves inside the first part 1, and the second part 2 is assembled in the same way so as to form a sandwich structure consisting of the first part 1, the plastic bearing 3, and the second part 2, where the plastic bearing 3 is surrounded by the first part 1 and second part 2; the spring lock 4 is inserted into through-holes 16 of the first part 1 and second part 2; the spring lock 4 is connected with the gasket 5 through the three stoppers 501; and finally the cylinder structure formed by the first part 1 and second part 2 is inserted into the cylindrical bracket 6 mounted on the front end of the electric motor 6.

Figure 14:
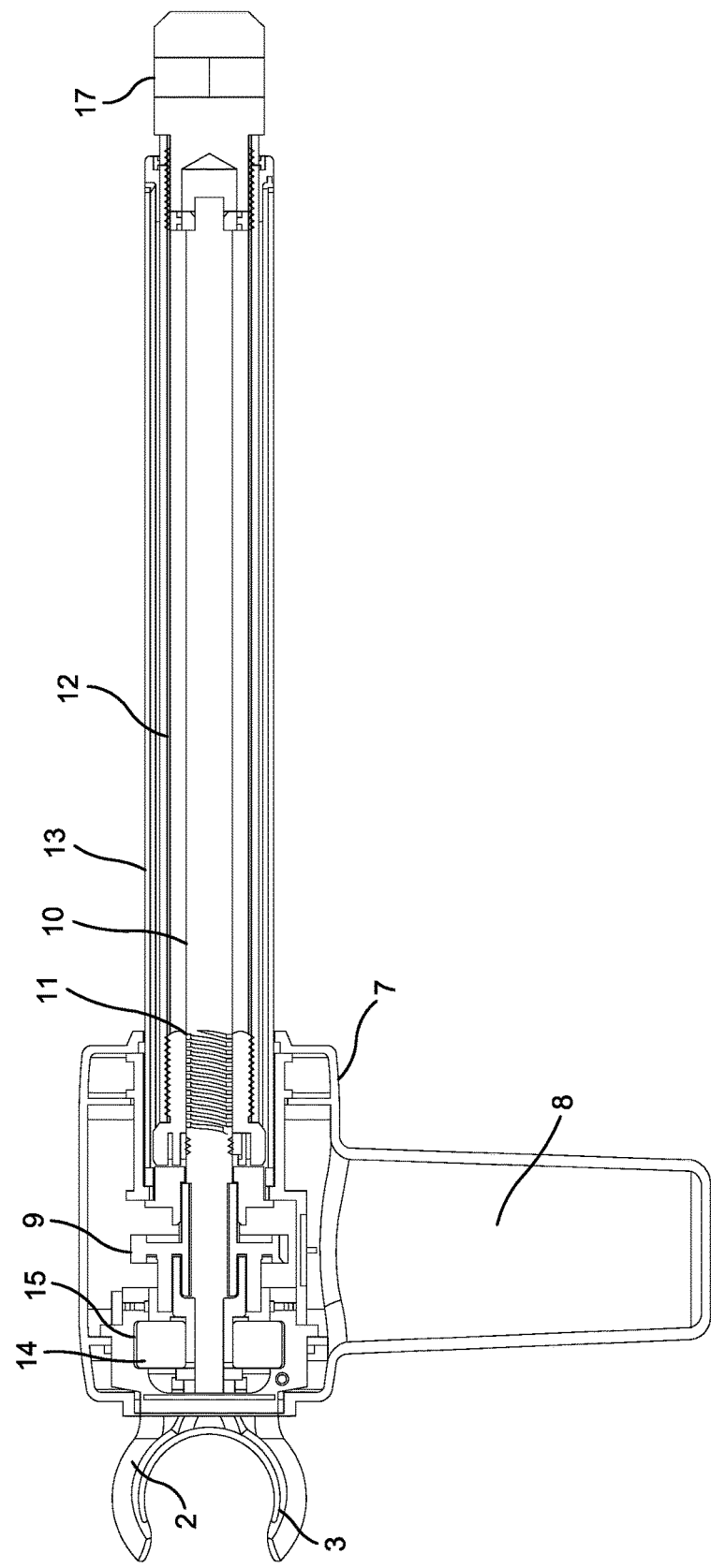
FIG. 14 is a longitudinal sectional view of a linear actuator.

As appears from FIG. 14, the main components of a linear actuator are a housing 7 with a reversible electric motor 8, which over a worm gear 9 drives a spindle 10 with a spindle nut 11, to which a tube-shaped positioning element 12, also called an inner tube, is fastened. The positioning element 12 is surrounded and guided by an outer tube 13. In one direction of rotation of the electric motor the positioning element 12 is expelled, and in the other direction it is retracted. A back fixture 1,2 is mounted at a rear end of the housing 7. At a rear end of the spindle 10 there is a ball bearing 14 which is located in a seating 15 of the back fixture 1,2, such that the force from the load on a front fixture 17 mounted at the distal end of the positioning element is lead directly to the back fixture 1,2.

The above descriptions are exemplary embodiments of the present invention, but are not intended to limit the scope of the present invention. Any equivalent shape and structure changes made without departing from the spirit and principle of the present invention shall fall within the scope of protection of the present invention.

What is claimed is:

1. A linear actuator comprising an electric motor, a transmission, a spindle unit with a spindle and a spindle nut, a positioning element secured to the spindle nut, the spindle being driven by the electric motor through the transmission, and a fixture for mounting the linear actuator on a shaft having a cylindrical cross section, said fixture comprising a first part, a second part, and a plastic bearing, wherein the first part and the second part are assembled together and define grooves therein, wherein the plastic bearing includes outer connection structures to secure the plastic bearing in the grooves, and wherein the first and second parts together provide a C-shaped eye with an opening on a free side for displacement onto the shaft.

2. The linear actuator according to claim 1, including pins and holes disposed on the first part and the second part to secure the assembly of the first part and second part.

3. The linear actuator according to claim 2, wherein the assembly of the first part and the second part is secured with four sets of pins and holes.

4. The linear actuator according to claim 1, where four connection structures are disposed on an outer side of the plastic bearing.

5. The linear actuator according to claim 1, further comprising a spring lock which connects the first part and second part.

6. The linear actuator according to claim 5, wherein through-holes are disposed on the first and second parts to secure the spring lock.

7. The linear actuator according to claim 6, further comprising a gasket connected to the spring lock.

8. The linear actuator according to claim 7, further comprising three stoppers which are part of the gasket, wherein the three stoppers connect the spring lock with the gasket.

9. The linear actuator according to claim 1, further comprising a bracket disposed outside the first and second parts.

10. The linear actuator according to claim 9, wherein the bracket is a hollow cylinder that covers the first and second parts.

* * * * *